United States Patent
Bizet et al.

(10) Patent No.: US 12,199,319 B2
(45) Date of Patent: Jan. 14, 2025

(54) COMPOSITIONS FOR BIPOLAR PLATES AND METHODS FOR PREPARING SAME

(71) Applicants: ARKEMA FRANCE, Colombes (FR); Whitecell Eisenhuth GmbH & Co. KG, Osterode (DE)

(72) Inventors: Stéphane Bizet, Barc (FR); Jérôme Chauveau, Mesnil en Ouche (FR); Thorsten Hickmann, Osterode (DE)

(73) Assignees: ARKEMA FRANCE, Colombes (FR); Whitecell Eisenhuth GmbH & Co. KG, Osterode (DE)

( * ) Notice: Subject to any disclaimer, the term of this patent is extended or adjusted under 35 U.S.C. 154(b) by 643 days.

(21) Appl. No.: 17/278,642

(22) PCT Filed: Sep. 20, 2019

(86) PCT No.: PCT/EP2019/075409
§ 371 (c)(1),
(2) Date: Mar. 22, 2021

(87) PCT Pub. No.: WO2020/058507
PCT Pub. Date: Mar. 26, 2020

(65) Prior Publication Data
US 2022/0045338 A1  Feb. 10, 2022

(30) Foreign Application Priority Data

Sep. 21, 2018  (EP) .................................... 18306227

(51) Int. Cl.
| | | |
|---|---|---|
| *H01M 8/02* | (2016.01) | |
| *B29C 43/00* | (2006.01) | |
| *H01M 8/0221* | (2016.01) | |
| *H01M 8/0226* | (2016.01) | |
| *B29K 27/00* | (2006.01) | |
| *B29K 507/04* | (2006.01) | |

(52) U.S. Cl.
CPC ......... *H01M 8/0221* (2013.01); *B29C 43/003* (2013.01); *H01M 8/0226* (2013.01); *B29K 2027/16* (2013.01); *B29K 2507/04* (2013.01); *B29K 2995/0005* (2013.01)

(58) Field of Classification Search
CPC . H01M 8/0221; H01M 8/0226; B29C 43/003; B29K 2027/16; B29K 2507/04
USPC ......................................................... 429/514
See application file for complete search history.

(56) References Cited

U.S. PATENT DOCUMENTS

| | | | |
|---|---|---|---|
| 4,098,967 A | 7/1978 | Biddick et al. | |
| 4,214,969 A | 7/1980 | Lawrance | |
| 4,339,322 A | 7/1982 | Balko et al. | |
| 2002/0136941 A1 | 7/2002 | Bonnet et al. | |
| 2005/0042496 A1 | 2/2005 | Bisara et al. | |
| 2012/0156583 A1* | 6/2012 | Chen .................. | H01M 8/0228 264/254 |
| 2014/0319429 A1 | 10/2014 | Nicolas et al. | |

FOREIGN PATENT DOCUMENTS

| | | |
|---|---|---|
| CN | 101615680 A | 8/2012 |
| EP | 1207535 B1 | 1/2006 |
| EP | 1466372 B1 | 5/2008 |
| FR | 3021811 A1 | 7/2016 |
| JP | 2002234946 A | 9/2003 |
| JP | 2009231034 A | 7/2013 |
| JP | 2015504577 A | 11/2015 |
| JP | 2011-119124 A | 6/2021 |
| KR | 1020090129704 A | 12/2009 |

OTHER PUBLICATIONS

International Search Report and Written Opinion, PCT/EP2019/075409, dated Oct. 18, 2019.

Antunes et al. "Investigation on the corrosion resistance of carbon black-graphite-poly(vinylidene fluoride) composite bipolar plates for polymer electrolyte membrane fuel cells" International Journal of Hydrogen Energy, vol. 36, No. 19, Sep. 2011 (2011-19) pp. 12474-12485.

Yeetsorn, Rungsima et al. 'Review of Thermoplastic Composites for Bipolar Plate Materials in PEM Fuel Cells', Nanocomposites with Unique Properties and Applications in Medicine and Industry. InTech, Aug. 23, 2011. doi: 10.5772/19262.

* cited by examiner

*Primary Examiner* — James M Erwin
(74) *Attorney, Agent, or Firm* — Boone IP Law

(57) ABSTRACT

The invention relates to a method for producing a composition comprising the steps of: melt-blending a fluorinated polymer, preferably a polyvinylidene fluoride polymer, with a first conductive filler so as to obtain a conductive fluorinated polymer; grinding to powder said conductive fluorinated polymer; mixing the powder of conductive fluorinated polymer with a second conductive filler. The invention also relates to a composition comprising a second conductive filler and particles of conductive fluorinated polymer, wherein the particles of conductive fluorinated polymer comprise a fluorinated polymer matrix in which a first conductive filler is dispersed The invention also relates to a method for producing a bipolar plate and to a bipolar plate.

11 Claims, No Drawings

COMPOSITIONS FOR BIPOLAR PLATES AND METHODS FOR PREPARING SAME

This application is a 35 U.S.C. § 371 US national stage entry of International Application number PCT/EP2019/075409, filed Sep. 20, 2019, and claims priority to EP Applications No. EP18306227.2 and EP18306227.2A filed Sep. 20, 2018. The contents of the aforementioned applications are incorporated by reference herein.

TECHNICAL FIELD

The present invention relates to new compositions for bipolar plates and to methods for producing such compositions.

TECHNICAL BACKGROUND

Bipolar plates are used in fuel cells and Redox-Flow batteries. They may be classed into three categories, depending on their constituting materials: bipolar plates made of metal, bipolar plates made of carbon and bipolar plates made of a polymer/carbon composite such as a polymer/graphite composite.

Polymer/carbon composite bipolar plates are of particular interest because of, inter alia, their relatively low cost of manufacturing, their resistance to corrosion and their low brittleness.

The article by Del Rio et al., New Polymer Bipolar Plates for Polymer Electrolyte Membrane Fuel Cells: Synthesis and Characterization, *Journal of Applied Polymer Science*, vol. 83, p. 2817-2822 (2002), describes bipolar plates made of from 60 to 100 wt. % polyvinylidene fluoride (PVDF) and from 0 to 40 wt. % carbon black. The bipolar plates are formed in a hydraulic press after the two components have been blended in an internal mixer.

The article by Stübler et al., Investigation of the properties of polymer composite bipolar plates in fuel cells, *Journal of Plastics Technology*, vol. 10, p. 68-89 (2014), describes a bipolar plate containing 15 wt. % of PVDF and 85 wt. % of graphite and a bipolar plate containing 15 wt. % of PVDF, 70 wt. % of graphite and 15 wt. % of carbon black. To manufacture the bipolar plates, the components are dried and mixed in a kneader and the mixture is heated in a hydraulic press.

The document by Huang et al., Compression moldable laminate composite bipolar plates for fuel cells, *ANTEC* 2004, p. 1405-1409 (2004), discloses multilayered bipolar plates comprising a core layer comprising graphite, polyester (PET) and glass fibers covered by skin layers made of a mixture of PVDF and graphite. The document by Cunningham et al., Materials and processing methods used in the production of polymer composite bipolar plates for fuel cells, *ANTEC* 2006, p. 1893-1897 (2006), discloses multilayered bipolar plates having a core layer of graphite, PET, carbon fibers and microglass and outer layers formed by a PVDF/graphite mixture.

The article by Altobelli Antunes et al., Investigation on the corrosion resistance of carbon black-graphite-poly(vinylidene fluoride) composite bipolar plates for polymer electrolyte membrane fuel cells, *International Journal of Hydrogen Energy*, vol. 36, p. 12474-12485 (2011), describes bipolar plates comprising 15 wt. % of PVDF, from 80 to 85 wt. % of graphite and from 0 to 5 wt. % of carbon black, prepared according to the following process: the components in a powdered form are mixed in a blender and the mixture is compression molded in a hydraulic press. In this process, the compression molding step does not enable to prevent the formation of isolating domains of PVDF binding the graphite particles in the final bipolar plate because the compression molding process does not result in a shear high enough to disperse the carbon black in the PVDF.

Document FR 3021811 describes a process for manufacturing a bipolar plate wherein a composition comprising lamellar graphite and a thermoplastic polymer is dry sieved, dry blended, deposited in a mold and then molded by thermocompression.

Documents EP 1466372 and EP 1207535 describe micro-composite powders comprising graphite flakes or graphite particles covered with fluoropolymer particles which can be extruded or injected in a press to produce bipolar plates. The powders are prepared by co-atomization of aqueous emulsions or dispersions containing the components.

Document U.S. Pat. No. 4,339,322 relates to a bipolar current collector-separator consisting of a molded aggregate of graphite and a thermoplastic fluoropolymer (in a ratio ranging from 2.5:1 to 16:1) reinforced with carbon fibers. To prepare the collector, the mixture of the three components was blended and then poured in a mold where it was compressed.

In document U.S. Pat. No. 4,214,969, a bipolar current collector-separator consisting of a molded aggregate of graphite and a thermoplastic fluoropolymer in a ratio ranging from 2.5:1 to 16:1 is produced by blending the mixture of graphite particles and PVDF particles in a blender and by compressing the powder mixture in a mold.

Document US 2005/0042496 describes a process for manufacturing electrically conductive polymer composite shaped articles such as bipolar plates wherein a plastic, a graphite fiber filler and optionally a graphite powder filler are melt-compounding and the melt is molded into plates. However, if PVDF is used in this process, the mixture of the components in a melt state will be highly viscous and, therefore, difficult to implement.

In document U.S. Pat. No. 4,098,967, finely divided PVDF is mixed with from 40 vol. % to 80 vol. % particles of vitreous carbon and then subjected to compression molding to form a substrate for a bipolar plate.

There is a need for a composition making it possible to produce bipolar plates with both high thermal conductivity, high electrical conductivity (in-plane and/or through-plane conductivity) and which can be easily processed. Moreover, bipolar plates having good mechanical properties are desirable.

SUMMARY OF THE INVENTION

It is a first object of the invention to provide a method for producing a composition comprising the steps of:
  melt-blending a fluorinated polymer, preferably a polyvinylidene fluoride polymer, with a first conductive filler so as to obtain a conductive fluorinated polymer;
  grinding to powder said conductive fluorinated polymer;
  mixing the powder of conductive fluorinated polymer with a second conductive filler.

In some embodiments, the second conductive filler is graphite.

In some embodiments, the first conductive filler is selected from the group consisting of electronically conductive polymers, carbon black, carbon nanotubes, graphene, graphite, carbon fibers and a mixture thereof, preferably the conductive filler is carbon black.

In some embodiments, the step of mixing the powder of conductive fluorinated polymer with a second conductive filler is a step of compounding the powder of conductive fluorinated polymer with the second conductive filler in an extruder.

In some embodiments, the first conductive filler is present in an amount of from 0.1% to 35% by weight, preferably from 1% to 20% by weight, more preferably from 2.5% to 15% by weight, based on the weight of the conductive fluorinated polymer.

In some embodiments, the conductive fluorinated polymer is present in an amount of from 10% to 40%, preferably from 10 to 30%, more preferably from 15 to 25% and the second conductive filler is present in an amount of from 60% to 90%, preferably from 70 to 90%, more preferably from 75 to 85% based on the total weight of the composition.

In some embodiments, the conductive fluorinated polymer is ground to a powder having a volume median diameter Dv50 ranging from 10 µm to 1 mm.

In some embodiments, the fluorinated polymer has a viscosity measured by capillary rheometry at a shear rate of 100 s$^{-1}$ and at 230° C. lower than 3000 Pa·s, preferably lower than 1500 Pa·s.

It is another object of the invention to provide a composition obtainable by the method as described above.

It is another object of the invention to provide a composition comprising a second conductive filler and particles of conductive fluorinated polymer, wherein the particles of conductive fluorinated polymer comprise a fluorinated polymer matrix in which a first conductive filler is dispersed.

In some embodiments, the fluorinated polymer matrix is a polyvinylidene fluoride matrix and/or the second conductive filler is graphite and/or the first conductive filler is selected from the group consisting of electronically conductive polymers, carbon black, carbon nanotubes, graphene, graphite, carbon fibers and a mixture thereof, and is preferably carbon black.

In some embodiments, the second conductive filler is present in an amount of from 60% to 90%, preferably from 70 to 90%, more preferably from 75 to 85% based on the total weight of the composition and/or the first conductive filler is present in an amount of 0.01% to 14%, preferably from 0.1% to 8%, more preferably from 0.25% to 6% based on the total weight of the composition.

In some embodiments, the fluorinated polymer has a viscosity measured by capillary rheometry at a shear rate of 100 s$^{-1}$ and at 230° C. lower than 3000 Pa·s, preferably lower than 1500 Pa·s.

It is another object of the invention to provide a method for producing a bipolar plate, comprising the steps of:
producing a composition according to the method as described above or providing the composition as described above;
compression-molding the composition.

It is another object of the invention to provide a bipolar plate obtainable by the method as described above or comprising the composition as described above The present invention enables to meet the abovementioned need. In particular, the invention provides compositions with good processing properties that can be used to produce bipolar plates having one or preferably several of the following advantageous features: a high in-plane conductivity, a high through-plane conductivity, a high thermal conductivity and good mechanical properties such as suitable flexural strength and compressive strength.

This is achieved by the use of a binder comprising a fluorinated polymer in which a conductive filler is dispersed. This reduces insulating domains in the plates and makes it possible to avoid the post-treatment of bipolar plates' surfaces, for example by sand blasting, which is often required after manufacturing by compression molding to remove the layer of insulating polymer when the binder consists only of a fluorinated polymer.

The invention also provides methods making it possible to obtain the compositions having the abovementioned advantages.

Indeed, the melt-blending of a fluorinated polymer with a first conductive filler and the mixing, in a separate step, of the obtained mixture with a second conductive filler make it possible to achieve a composition for composite bipolar plates in which the binder comprises a conductive fluorinated polymer, i.e. a fluorinated polymer in which the first conductive filler is dispersed. Furthermore, the conductive fluorinated polymer can be easily processed.

DESCRIPTION OF EMBODIMENTS

The invention will now be described in more detail without limitation in the following description.

Unless otherwise mentioned, the percentages in the present application are percentages by weight.

Composition for Bipolar Plate

In a first aspect, the invention relates to a composition suitable for making bipolar plates. The composition comprises a mixture of particles of a (preferably carbon-based) conductive filler, designated herein as the "second conductive filler" and particles of a conductive fluorinated polymer, which comprise a conductive filler, designated herein as the "first conductive filler" which is dispersed in a matrix of fluorinated polymer.

The composition may be in the form of a powder, in which case the particles of conductive fluorinated polymer are simply present in admixture with the particles of the second conductive filler.

Alternatively, the composition may be in a solid, agglomerated form, in which case the particles of the second conductive filler are bound to the particles (or domains) of conductive fluorinated polymer. When the composition is shaped into a bipolar plate, it is in such an agglomerated form.

The dispersion of the first conductive filler in the fluorinated polymer makes it possible to render the fluorinated polymer conductive. A fluorinated polymer is conductive when the resistance of a strand such polymer is lower than $10^6$ Ohm. Preferably, the loading of the first conductive filler is such that the percolation threshold throughout the fluorinated polymer matrix is reached.

Preferably, the second conductive filler and the first conductive filler dispersed in the fluorinated polymer are different from each other, in average size or size distribution and/or in nature.

The second conductive filler is advantageously graphite.

The Dv50 of the second conductive filler may be equal to or lower than 2500 µm, preferably equal to or lower than 1000 µm, more preferably equal to or lower than 500 µm. In some embodiments, the Dv50 of the second conductive filler is from 10 µm to 50 µm, or from 50 to 100 µm, or from 100 to 150 µm, or from 150 to 200 µm, or from 200 to 250 µm, or from 250 to 300 µm, or from 300 to 350 µm, or from 350 to 400 µm, or from 400 to 450 µm, or from 450 to 500 µm, or from 500 to 600 µm, or from 600 to 700 µm, or from 700 to 800 µm, or from 800 to 900 µm, or from 900 to 1000 µm, or from 1000 to 1100 µm, or from 1100 to 1200 µm, or from 1200 to 1300 µm, or from 1300 to 1400 µm, or from 1400 to 1500 µm, or from 1500 to 1600 µm, or from 1600 to 1700 µm, or from 1700 to 1800 µm, or from 1900 to 2000 µm, or from 2000 to 2100 µm, or from 2100 to 2200 µm, or from 2200 to 2300 µm, or from 2300 to 2400 µm, or from 2400 to 2500 µm.

The Dv50 is the particle size at the $50^{th}$ percentile (in volume) of the cumulative size distribution of particles. This parameter may be determined by laser granulometry. This applies to all Dv50 recited in the present description.

The composition may for instance comprise from 60 to 90% by weight of second conductive filler, based on the total weight of the composition. In some embodiments, the composition comprises from 60 to 65% by weight, or from 65 to 70% by weight, or from 70 to 75% by weight, or from 75 to 80% by weight, or from 80 to 85% by weight, or from 85 to 90% by weight, of second conductive filler, based on the total weight of the composition.

The particles of conductive fluorinated polymer may have a Dv50 of from 0.1 µm to 1 mm, in particular of from 0.1 µm to 5 µm, or from 5 µm to 50 µm, or from 50 µm to 100 µm, or from 100 µm to 200 µm, or from 200 µm to 300 µm, or from 300 µm to 400 µm, or from 400 µm to 500 µm, or from 500 µm to 600 µm, or from 600 µm to 700 µm, or from 700 µm to 800 µm, or from 800 µm to 900 µm, or from 900 µm to 1 mm.

The first conductive filler dispersed in the fluorinated polymer may be an electronically conductive polymer. Suitable electronically conductive polymers are polyacetylene polymer, polyphenylene vinylene polymer, polythiophene polymer, polyaniline polymer, polypyrrole polymer, polyphenylene sulfide polymer or a mixture thereof. Alternatively, or in addition, the first conductive filler may comprise conductive carbon particles, for example carbon black, carbon nanotubes, graphene, graphite, carbon fibers or a combination thereof.

The first conductive filler dispersed in the matrix of fluorinated polymer may have a specific surface area measured by the BET method under nitrogen according to ASTM D3037 of from 0.1 $m^2/g$ to 2000 $m^2/g$ and preferentially from 10 $m^2$ to 1000 $m^2/g$. In some embodiments, the first conductive filler may have a BET surface area of from 0.1 to 1 $m^2/g$, or from 1 to 10 $m^2/g$, or from 10 to 50 $m^2/g$, or from 10 to 50 $m^2/g$, or from 50 to 200 $m^2/g$, or from 200 to 400 $m^2/g$, or from 400 to 600 $m^2/g$, or from 600 to 800 $m^2/g$, or from 800 to 1000 $m^2/g$, or from 1000 to 1200 $m^2/g$, or from 1200 to 1400 $m^2/g$, or from 1400 to 1600 $m^2/g$, or from 1600 to 1800 $m^2/g$, or from 1800 to 2000 $m^2/g$.

The first conductive filler dispersed in the fluorinated polymer may be present in the composition, based on the total weight of the composition, in an amount of from 0.01% to 0.10% by weight, from 0.10 to 0.20% by weight, from 0.20 to 0.25% by weight, from 0.25 to 0.30% by weight, from 0.30 to 0.35% by weight, from 0.35 to 0.40% by weight, from 0.40 to 0.45% by weight, from 0.45 to 0.50% by weight, from 0.50 to 0.55% by weight, from 0.55 to 0.60% by weight, from 0.60 to 0.65% by weight, from 0.65 to 0.70% by weight, from 0.70 to 0.75% by weight, from 0.75 to 0.80% by weight, from 0.80 to 0.85% by weight, from 0.85 to 0.90% by weight, from 0.90 to 0.95% by weight, from 0.95 to 1% by weight, from 1 to 2% by weight, from 2 to 3% by weight, from 3 to 4% by weight, from 4 to 5% by weight, from 5 to 6% by weight, from 6 to 7% by weight, from 7 to 8% by weight, from 8 to 9% by weight, from 9 to 10% by weight, from 10 to 11% by weight, from 11 to 12% by weight, from 12 to 13% by weight, from 13 to 14% by weight.

The fluorinated polymer may comprise within its backbone at least one unit from a monomer chosen among vinyl monomers containing at least one fluorine atom, vinyl monomers comprising at least one fluoroalkyl group and vinyl monomers comprising at least one fluoroalkoxy group. As an example, this monomer can be vinyl fluoride; vinylidene fluoride; trifluoroethylene (VF3); chlorotrifluoroethylene (CTFE); 1,2-difluoroethylene; tetrafluoroethylene (TFE); hexafluoropropylene (HFP); a perfluoro(alkyl vinyl) ether such as perfluoro(methyl vinyl)ether (PMVE), perfluoro(ethyl vinyl) ether (PEVE) or perfluoro(propyl vinyl) ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_m$ and m is 1, 2, 3 or 4; the product of formula $R_2OCF=CH_2$ in which $R_2$ is $F(CF_2)_p$ and p is 1, 2, 3 or 4; perfluorobutyl ethylene (PFBE); 3,3,3-trifluoropropene or 2-trifluoromethyl-3,3,3-trifluoro-1-propene.

The fluorinated polymer can be a homopolymer or a copolymer. It may also comprise units from non-fluorinated monomers like ethylene.

Advantageously, the fluorinated polymer is a polyvinylidene fluoride polymer.

The polyvinylidene fluoride polymer is preferably a homopolymer.

In other embodiments, the polyvinylidene fluoride polymer may be a copolymer comprising vinylidene fluoride units and units from one or more other monomers. Examples of other monomers are vinyl fluoride; trifluoroethylene; chlorotrifluoroethylene (CTFE); 1,2-difluoroethylene, tetrafluoroethylene (TFE); hexafluoropropylene (HFP); perfluoro(alkyl vinyl)ethers such as perfluoro(methyl vinyl) ether (PMVE), perfluoro(ethyl vinyl)ether (PEVE) or perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R'CH_2OCF=CF_2$ in which R' is hydrogen or $F(CF_2)_z$ and z is 1, 2, 3 or 4; the product of formula $R''OCF=CH_2$ in which R" is $F(CF_2)_z$ and z is 1, 2, 3 or 4; perfluorobutylethylene (PFBE); 3,3,3-trifluoropropene or 2-trifluoromethyl-3,3,3-trifluoro-1-propene. Hexafluoropropylene is preferred. The polyvinylidene fluoride copolymer may also comprise units from ethylene monomer. Preferably, when the polyvinylidene fluoride polymer is a copolymer, it contains at least 50% by weight, more preferably at least 60% by weight, even more preferably at least 70% by weight, even more preferably at least 80% by weight, of vinylidene fluoride units.

The fluorinated polymer may be a mixture of two or more of the abovementioned polymers.

In the composition, the fluorinated polymer may be present in an amount of from 6.5% to 39.96% by weight, preferably from 8% to 39.6% by weight, more preferably from 8.5% to 39%, based on the total weight of the composition. In some embodiments, the fluorinated polymer may be present in an amount of from 6.5% to 10% by weight, from 10% to 15% by weight, from 15% to 20% by weight, from 20% to 25% by weight, from 25% to 30% by weight, from 30% to 35% by weight, from 35% to 39.96% by weight, based on the total weight of the composition.

The fluorinated polymer may have a viscosity measured by capillary rheometry according to ASTMD3835 at a shear rate of 100 s$^{-1}$ and at 230° C. lower than 3000 Pa·s and more preferably lower than 1500 Pa·s. For example, the fluorinated polymer may have a viscosity measured by capillary rheometry according to ASTMD3835 at a shear rate of 100 s−1 and at 230° C. lower than 2800 Pa·s, or lower than 2500 Pa·s, or lower than 2000 Pa·s, or lower than 1800 Pa·s, or lower than 1500 Pa·s, or lower than 1200 Pa·s, or lower than 1000 Pa·s.

Bipolar Plate

The invention also relates to a bipolar plate comprising the composition as described above, in agglomerated form. A bipolar plate is a plate that works as a partition between elementary cells in fuel cells and Redox-Flow batteries. Generally, it is in the shape of a parallelepiped having a thickness of a few millimeters (typically between 0.2 and 6 mm) and comprises on each of its faces a network of channels for the circulation of gases and fluids. Its functions are usually to supply the fuel cell with gas fuel, to discharge the reaction products and to collect the electric current produced in the cell.

Advantageously, the bipolar plate exhibits one or more, and preferably all, of the following properties:
 an in-plane resistivity equal to or lower than 0.01 Ohm·cm;
 a through-plane resistivity equal to or lower than 0.03 Ohm·cm;
 a thermal conductivity equal to or higher than 10 W/m/K;
 a flexural strength equal to or higher than 25 N/mm$^2$;
 a compressive strength equal to or higher than 25 N/mm$^2$.

The flexural strength is measured according to standard DIN EN ISO 178. The compressive strength is measured according to ISO 604. The thermal conductivity is measured according the laser flash method of DIN EN ISO 821. In-plane resistivity is measured using a four-point probe setup samples on milled samples with a thickness of 4 mm. Through-plane resistivity was measured with a two-electrode installation and a contact pressure of 1 N/mm$^2$ on milled samples with a diameter of 13 mm and a thickness of 2 mm.

In some embodiments, the bipolar plate has an in-plane resistivity equal to or lower than 0.008 Ohm·cm, or equal to or lower than 0.005 Ohm·cm, or equal to or lower than 0.003 Ohm·cm.

In some embodiments, the bipolar plate has a through-plane resistivity equal to or lower than 0.025 Ohm·cm, or equal to or lower than 0.02 Ohm·cm, or equal to or lower than 0.015 Ohm·cm.

In some embodiments, the bipolar plate has a thermal conductivity equal to or higher than 15 W/m/K, or equal to or higher than 20 W/m/K.

In some embodiments, the bipolar plate has a flexural strength equal to or higher than 30 N/mm$^2$, or equal to or higher than 35 N/mm$^2$.

Processes

In another aspect, the invention relates to a method for producing the above composition comprising the steps of:
 melt-blending the fluorinated polymer with the first conductive filler so as to obtain the conductive fluorinated polymer;
 grinding to powder said conductive fluorinated polymer;
 mixing the powder of conductive fluorinated polymer with the second conductive filler.

In this method, the first conductive filler, the fluorinated polymer and the second conductive filler may have any optional or preferred feature described above in relation with the composition for bipolar plate.

The process of the invention comprises a step of melt-blending the fluorinated polymer with the first conductive filler so as to obtain the conductive fluorinated polymer. This step makes it possible to prepare an intimate mixture of the fluorinated polymer and the first conductive filler, called "conductive fluorinated polymer". Preferably, the first conductive filler is dispersed in the fluorinated polymer.

Preferably, the fluorinated polymer and the first conductive filler to be melt-blended are in a powdered form.

The first conductive filler to be melt-blended with the fluorinated polymer may have a BET surface area measured by the BET method under nitrogen according to ASTM D3037 of from 0.1 m$^2$/g to 2000 m$^2$/g, and preferentially from 10 m$^2$ to 1000 m$^2$/g. In some embodiments, the first conductive filler may have a BET surface area of from 0.1 to 1 m$^2$/g, or from 1 to 10 m$^2$/g, or from 10 to 50 m$^2$/g, or from 10 to 50 m$^2$/g, or to 50 to to 200 m$^2$/g, or from 200 to 400 m$^2$/g, or from 400 to 600 m$^2$/g, or from 600 to 800 m$^2$/g, or from 800 to 1000 m$^2$/g, or from 1000 to 1200 m$^2$/g, or from 1200 to 1400 m$^2$/g, or from 1400 to 1600 m$^2$/g, or from 1600 to 1800 m$^2$/g, or from 1800 to 2000 m$^2$/g. In an advantageous variant, the melt-blending step is carried out by extrusion, for example by using a kneader or a twin-screw extruder. In order to achieve a good dispersion of the first conductive filler within the fluorinated polymer, a screw profile leading to a dispersive mixing thanks to high shear rate will be preferred.

As an example, in a classical extrusion process for melt-blending the fluorinated polymer with the first conductive filler, pellets of polymer are melted by conveying them along the screw that is heated up to temperatures ranging from Tm+20° C. and Tm+70° C. (Tm being the melting temperature (in ° C.) of the fluorinated polymer). Conductive filler is preferably fed with a dosing unit. Preferably, after extrusion process, pellets are obtained by cutting strand method or under water pelletizing.

The conductive fluorinated polymer may contain from 0.1% to 1% by weight, or from 1% to 2.5% by weight, or from 2.5% to 5% by weight, or from 5% to 10% by weight, or from 10% to 15% by weight, or from 15% to 20% by weight, or from 20% to 25% by weight, or from 25% to 30% by weight, or from 30% to 35% by weight, of first conductive filler, based on the weight of the conductive fluorinated polymer.

The conductive fluorinated polymer may be made in the form of pellets.

The process of the invention also comprises a step of grinding to powder the conductive fluorinated polymer. Any grinding technologies may be used to perform this step, for example a hammer mill. In some embodiments, the powder retrieved from the grinding step has a Dv50 of from 0.1 μm to 1 mm, in particular of from 0.1 μm to 5 μm, or from 5 μm to 50 μm, or from 50 μm to 100 μm, or from 100 μm to 200 μm, or from 200 μm to 300 μm, or from 300 μm to 400 μm, or from 400 μm to 500 μm, or from 500 μm to 600 μm, or from 600 μm to 700 μm, or from 700 μm to 800 μm, or from 800 μm to 900 μm, or from 900 μm to 1 mm.

The powder of conductive fluorinated polymer is then mixed with the second conductive filler.

The second conductive filler may be in a powdered form. The Dv50 of the second conductive filler may be equal to or lower than 2500 µm, preferably equal to or lower than 1000 µm, more preferably equal to or lower than 500 µm. In some embodiments, the Dv50 of the second conductive filler is from 10 µm to 50 µm, or from 50 to 100 µm, or from 100 to 150 µm, or from 150 to 200 µm, or from 200 to 250 µm, or from 250 to 300 µm, or from 300 to 350 µm, or from 350 to 400 µm, or from 400 to 450 µm, or from 450 to 500 µm, or from 500 to 600 µm, or from 600 to 700 µm, or from 700 to 800 µm, or from 800 to 900 µm, or from 900 to 1000 µm, or from 1000 to 1100 µm, or from 1100 to 1200 µm, or from 1200 to 1300 µm, or from 1300 to 1400 µm, or from 1400 to 1500 µm, or from 1500 to 1600 µm, or from 1600 to 1700 µm, or from 1700 to 1800 µm, or from 1900 to 2000 µm, or from 2000 to 2100 µm, or from 2100 to 2200 µm, or from 2200 to 2300 µm, or from 2300 to 2400 µm, or from 2400 to 2500 µm.

The mixing step may be carried out for instance by compounding the powder of conductive fluorinated polymer with the second conductive filler. Advantageously, the compounding of the powder of conductive fluorinated polymer with the second conductive filler takes place in an extruder, for example in a twin-screw extruder.

The conductive fluorinated polymer is preferably in an amount of from 10% to 15% by weight, or from 15% to 20% by weight, or from 20% to 25% by weight, or from 25% to 30% by weight, or from 30% to 35% by weight, or from 35% to 40% by weight, based on the total weight of the composition for bipolar plate. The second conductive filler is preferably in an amount of from 60% to 65% by weight, or from 65% to 70% by weight, or from 70% to 75% by weight, or from 75% to 80% by weight, or from 80% to 85% by weight, or from 85% to 90% by weight, based on the total weight of the composition for bipolar plate.

The invention also pertains to a composition for bipolar plates produced according to the process described above.

In another aspect, the invention relates to a method for producing a bipolar plate, comprising the steps of:
producing a composition for bipolar plate according to a method as described above;
compression-molding of the composition for bipolar plate.

Preferably, the composition for bipolar plate to be subjected to compression-molding is in a powdered form. The process according to the invention may comprise a step of grinding to powder the composition for bipolar plate, for example with a disc mill.

The compression-molding of compositions for producing bipolar plates is well known by the skilled person. For example, the compression-molding step may be carried out according to the following manner: the composition for bipolar plate is put into a mold, for example a stainless-steel mold, which is then closed and the mold containing the composition is heated to a temperature of from 200° C. to 350° C., preferably from 250° C. to 300° C. Then, a compression of from 300 t to 800 t, preferably from 400 t to 600 t, is applied to the mold, for a mold size of from 100000 to 150000 mm². Typically, a compression force of 500 t is applied when the mold size is 130000 mm² and a compression force of 300 t is applied when the mold size is 44000 mm². The mold is cooled down to a temperature of from 50° C. to 120° C., preferably from 60° C. to 100° C., and the plate is demolded.

In some embodiments, the bipolar plate exhibits one or more, and preferably all, of the following properties:
an in-plane resistivity equal to or lower than 0.01 Ohm·cm;
a through-plane resistivity equal to or lower than 0.03 Ohm·cm;
a thermal conductivity equal to or higher than 10 W/m/K;
a flexural strength equal to or higher than 25 N/mm²;
a compressive strength equal to or higher than 25 N/mm².

The flexural strength is measured according to standard DIN EN ISO 178. The compressive strength is measured according to ISO 604. The thermal conductivity is measured according to the laser flash method of DIN EN ISO 821. Through-plane resistivity is measured using a four-point probe setup In some embodiments, the bipolar plate has an in-plane resistivity equal to or lower than 0.008 Ohm·cm, or equal to or lower than 0.005 Ohm·cm, or equal to or lower than 0.003 Ohm·cm.

In some embodiments, the bipolar plate has a through-plane resistivity equal to or lower than 0.025 Ohm·cm, or equal to or lower than 0.02 Ohm·cm, or equal to or lower than 0.015 Ohm·cm.

In some embodiments, the bipolar plate has a thermal conductivity equal to or higher than 15 W/m/K, or equal to or higher than 20 W/m/K.

In some embodiments, the bipolar plate has a flexural strength equal to or higher than 30 N/mm², or equal to or higher than 35 N/mm².

Compared to the bipolar plates produced as described above or comprising the composition as described above, a bipolar plate produced by a compression molding process using particles of fluorinated polymer that has not been made conductive will comprise much more isolating domains, made of insulating fluorinated polymer.

EXAMPLES

The following example illustrates the invention without limiting it.

Raw Materials

The materials used in the compositions for producing bipolar plates are the following:
PVDF 1: Homopolymer of vinylidene fluoride commercialized by Arkema under the trade name of Kynar® and characterized by a viscosity measured by capillary rheometry at a shear rate of 100 s$^{-1}$ and 230° C. of 300 Pa·s and a melt flow rate measured at 230° C. under 2.16 kg of 30 g/10 minutes;
PVDF 2: Homopolymer of vinylidene fluoride commercialized by Arkema under the trade name of Kynar® and characterized by a viscosity measured by capillary rheometry at a shear rate of 100 s$^{-1}$ and 230° C. of 1900 Pa·s and a melt flow rate measured at 230° C. under 3.8 kg of 15 g/10 minutes;
First conductive filler: conductive carbon black commercialized by IMERYS and having a BET surface area of 70 m²/g measured under nitrogen according to ASTM D3037;
Second conductive filler: synthetic graphite commercialized by IMERYS and having a purity of more than 99% carbon content.

Conductive PVDF 1 Preparation

PVDF 1 was blended with 10% by weight of conductive carbon black (based on the weight of the blend of PVDF and carbon black) in the melt state with a kneader from BUSS corporation. After compounding, pellets were cryo-grinded with a Mikropul D2H hammer mill. The average particle size was characterized by a Dv50 of 150 μm.

Conductive PVDF Resistance Measurement

Strands of non-conductive PVDF 1 (i.e. PVDF 1 without conductive filler) and conductive PVDF 1 (i.e. PVDF 1 which was melt-blended with 10% by weight of conductive carbon as described above) were produced by means of capillary rheometer 2000 Göttfert equipped with a die of 10 mm in diameter and 30 mm in length at a shear rate of 10 s$^{-1}$ and at 230° C.

The resistance of the strands thus obtained was measured by means of an Ohm-meter M1500P from Sefelec by applying a voltage of 10 V with a gap of 10 mm between both electrodes.

Results are summarized in the following table.

|                      | Resistance (Ohm) |
|----------------------|------------------|
| Non conductive PVDF 1 | >10$^{12}$       |
| Conductive PVDF 1    | 5.10$^{3}$       |

Compound Preparation

The conductive PVDF powder was mixed with 80% by weight of graphite (based on the weight of the mixture of conductive PVDF and graphite). The premix was compounded in a twin-screw extruder. The received pellets were grinded to powder with a disc mill. The particle size was smaller than 500 μm.

Bipolar Plate Preparation

The powder was filled into the cavity of a stainless-steel mold having a size of 130000 mm$^2$ and subsequently flattened with a doctor blade. The mold was closed, heated up to at least 280° C. and compressed with at most 500 t while the mold was cooled down to the demolding temperature of at least 80° C. The mold was opened and the raw plate was demolded.

A comparative bipolar plate was produced in the same manner, except that PVDF 2 instead of conductive PVDF 1 was mixed with graphite (i.e. the PVDF 2 was directly mixed with 80% by weight of graphite, without being previously melt-blended with a conductive filler).

The bipolar plate according to the invention and the comparative bipolar plate were assessed for in-plane and through-plane resistivities, flexural and compressive strengths and flexural modulus.

Characterization Methods

In-plane resistivity was measured with a Loresta GP T600 equipped with an ASP 4-point probe. The samples were milled to a constant thickness of 4 mm.

Through-plane resistivity was measured with a two-electrode installation and a contact pressure of 1 N/mm$^2$ on milled samples with a diameter of 13 mm and a thickness of 2 mm.

Flexural strength was measured according to DIN EN ISO 178.

Compressive strength was measured according to ISO 604.

Flexural modulus was measured according to DIN EN ISO 178.

Results

The results are summarized in the following table.

|  | In-plane resistivity (Ohm · cm) | Through-plane resistivity (Ohm · cm) | Flexural strength (N/mm$^2$) | Flexural modulus (N/mm$^2$) | Compressive strength (N/mm$^2$) |
|---|---|---|---|---|---|
| Bipolar plate according to the invention (with conductive PVDF 1) | 0.003 | 0.015 | 35 | 11000 | 45 |
| Comparative bipolar plate (with non-conductive PVDF 2) | 0.007 | 0.025 | 40 | 12000 | 46 |

The bipolar plate according to the invention exhibits a lower in-plane resistivity (i.e. a higher in-plane conductivity) and a lower through-plane resistivity (i.e. a higher through-plane conductivity) while maintaining good flexural and compressive strengths.

What is claimed is:

1. A method for producing a composition comprising the steps of:
    melt-blending a fluorinated polymer with a first conductive filler so as to obtain a conductive fluorinated polymer;
    grinding to powder said conductive fluorinated polymer; and
    mixing the powder of conductive fluorinated polymer with a second conductive filler,
    wherein the first conductive filler is present in an amount of from 0.1% to 35% by weight based on the weight of the conductive fluorinated polymer.

2. The method according to claim 1, wherein the second conductive filler is graphite.

3. The method according to claim 1, wherein the first conductive filler is selected from the group consisting of electronically conductive polymers, carbon black, carbon nanotubes, graphene, graphite, carbon fibers and a mixture thereof.

4. The method according to claim 1, wherein the step of mixing the powder of conductive fluorinated polymer with a second conductive filler is a step of compounding the powder of conductive fluorinated polymer with the second conductive filler in an extruder.

5. The method according to claim 1, wherein the conductive fluorinated polymer is present in an amount of from 10% to 40%, and the second conductive filler is present in an amount of from 60% to 90%, based on the total weight of the composition.

6. The method according to claim 1, wherein the conductive fluorinated polymer is ground to a powder having a volume median diameter Dv50 ranging from 10 μm to 1 mm.

7. The method according to claim 1, wherein the fluorinated polymer has a viscosity measured by capillary rheometry at a shear rate of $100$ $s^{-1}$ and at 230° C. lower than 3000 Pa·s.

8. A composition obtainable by the method according to claim 1.

9. A method for producing a bipolar plate, comprising the steps of:
   producing a composition according to the method of claim 1;
   compression-molding the composition.

10. The method according to claim 1, wherein the fluorinated polymer is a polyvinylidene fluoride polymer.

11. A method for producing a bipolar plate, comprising the steps of:
   providing the composition of claim 8;
   compression-molding the composition.

* * * * *